United States Patent [19]
Batter, Jr. et al.

[11] 3,772,975
[45] Nov. 20, 1973

[54] PHOTOGRAPHIC FILM CASSETTE EMPLOYING COATED PROCESSOR VALVE

[75] Inventors: John F. Batter, Jr., Lincoln; Joseph A. Stella, Peabody; Albert W. Held, Littleton, all of Mass.

[73] Assignee: Polaroid Corporation, Cambridge, Mass.

[22] Filed: Jan. 2, 1973

[21] Appl. No.: 320,613

[52] U.S. Cl. .................. 95/13, 95/89 R, 222/559, 222/561, 352/78
[51] Int. Cl. .......................................... G03b 17/50
[58] Field of Search ................ 95/13, 89 R; 352/78, 352/130; 222/542, 544, 559, 561

[56] References Cited
UNITED STATES PATENTS

| | | | |
|---|---|---|---|
| 3,641,896 | 2/1972 | Downey et al. | 222/559 |
| 3,643,579 | 2/1972 | Downey et al. | 352/78 R |
| 3,711,192 | 1/1973 | Land | 352/130 |
| 3,667,361 | 6/1972 | Meggs et al. | 95/89 R |
| 2,435,719 | 2/1948 | Land | 95/13 |

Primary Examiner—Richard L. Moses
Attorney—Robert L. Berger et al.

[57] ABSTRACT

A photographic film cassette having a processing station configured to dispense processing fluid to the film strip following exposure thereof and including a valve-like member carrying a thin surface coating adapted for sealing of the processor nozzle following application of the fluid to the film strip. The coating is located upon the sealing area of the valve and is of material which interacts with the fluid so as to conform to the nozzle and fill any voids in the seal area. Additionally, the coating is utilized to cement the valve in its sealing location.

15 Claims, 8 Drawing Figures

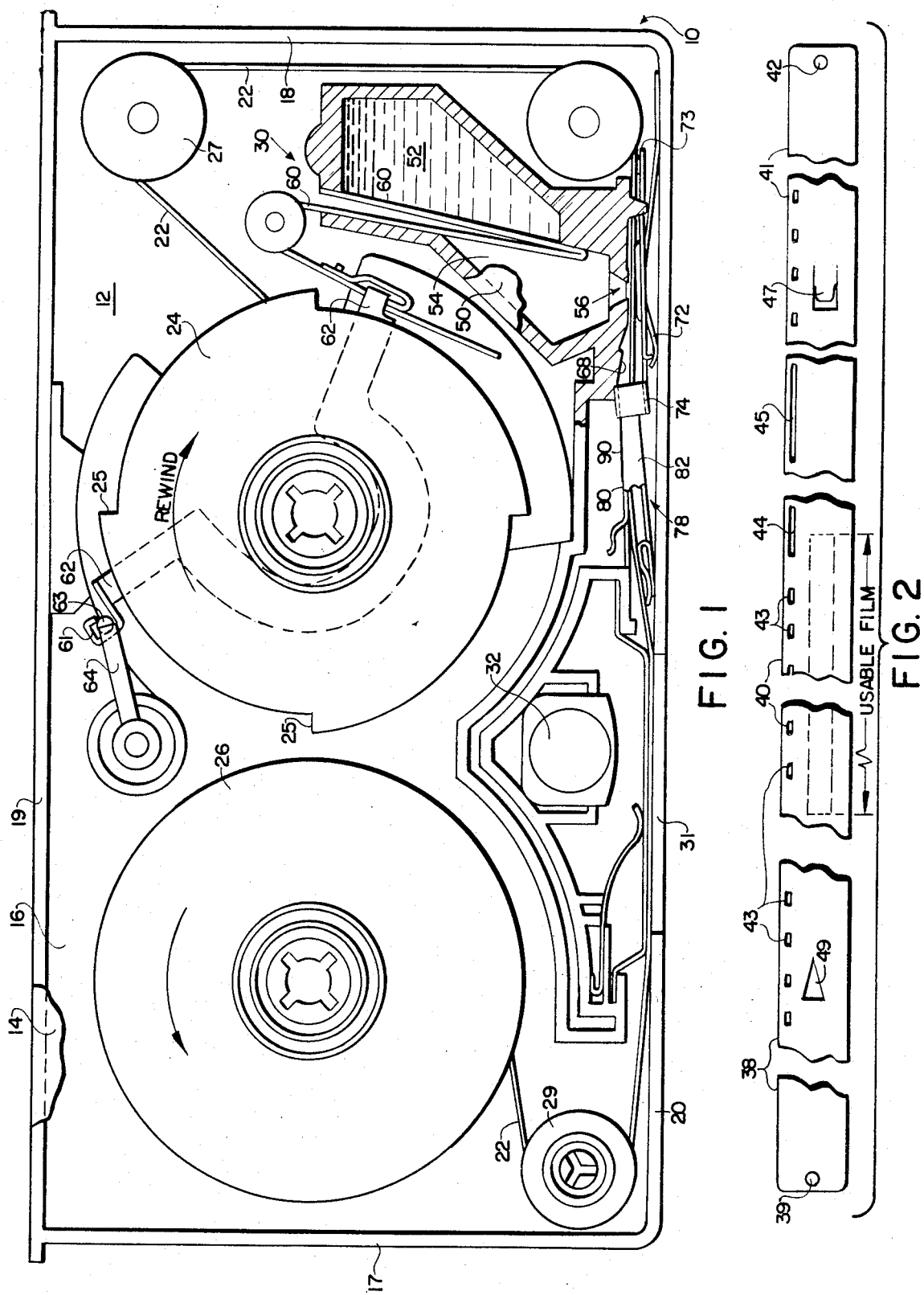

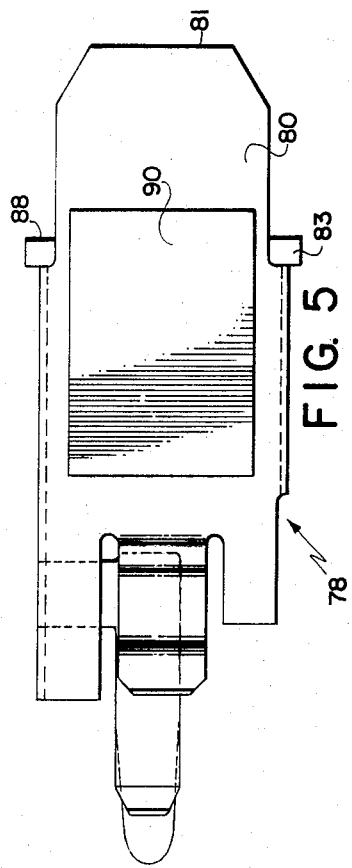
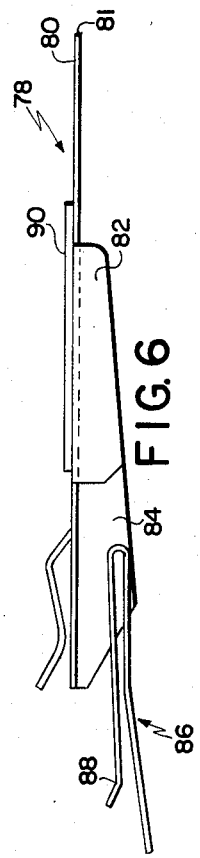
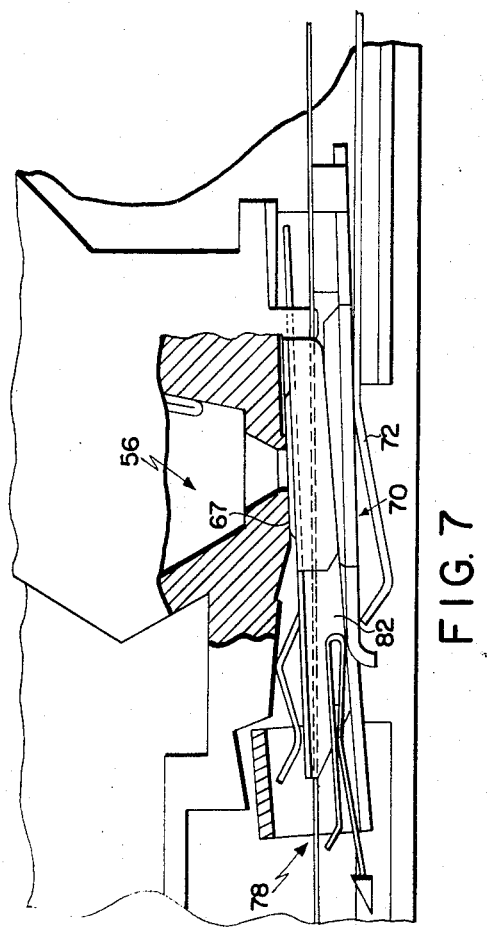
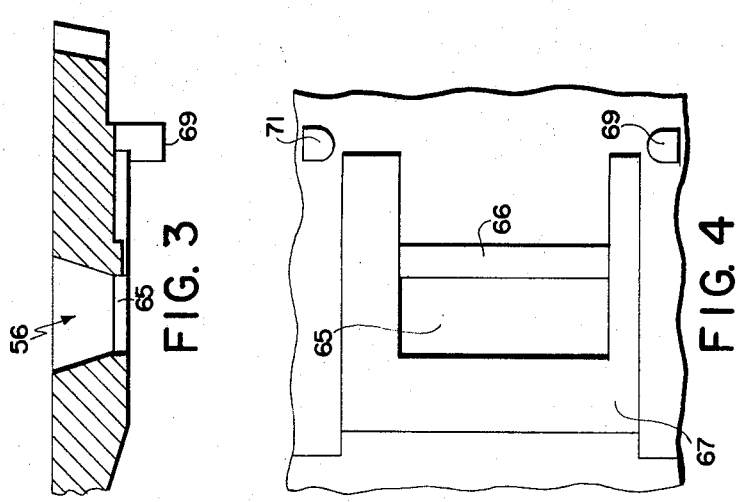
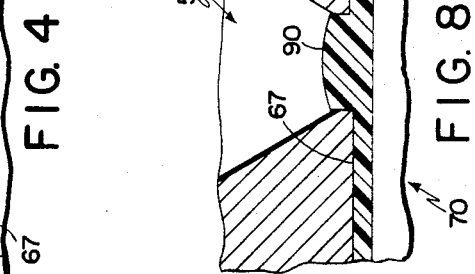

PHOTOGRAPHIC FILM CASSETTE EMPLOYING COATED PROCESSOR VALVE

BACKGROUND OF THE INVENTION

1. Field of the Invention

This invention relates to photographic film cassettes and more particularly to a multipurpose film handling cassette having an improved film processing station.

2. Description of the Prior Art

The present application is directed to photographic film cassettes from which the film strip need not be removed during the exposure, processing and projection operations. Exemplary of such systems, are those described in prior U. S. Pat. No. 3,614,127 of Edwin H. Land issued Oct. 26, 1971; and U.S. Pat. No. 3,641,896 of Rogers B. Downey issued Feb. 15, 1972. Each of the systems described in the aforementioned patents employ a photographic film cassette which includes a processing station through which processing fluid may be applied to the film strip following its exposure. The processing fluid is initially stored within the cassette in a dispensing container from which it may be released through a nozzle onto the exposed film strip as the latter is transported thereacross.

Following application of the processing fluid to the film strip, it is important to effectively control further flow of the fluid from the application system. Hence, in the above-noted U.S. Pat. No. 3,641,896 a closure member is displaced across the nozzle once the application of the fluid is completed. Similarly, the cassette system described in the commonly assigned patent application Ser. No. 227,092 of John F. Batter, Jr., et al., filed Feb. 17, 1972, which provides substantially automatic processing of the film responsive to appropriate transport of the latter within the cassette, employs a valve-like closure member configured for displacement into blocking position across the processor nozzle following treatment of the film.

Since the nozzle structure usually includes a doctor blade element, a perfectly coplanar nozzle surface is not generally available for sealing engagement, and hence, it is diffucult to completely eliminate leakage of fluid from the applicator solely with a rigid valve member. Additionally, in the processing system utilized in the aforementioned copending patent application the valve is laterally displaced across the nozzle surface and between it and a film engaging pressure pad so as to simultaneously close off the nozzle and to also cam the pad out of its operative position at the completion of the processing operation. Hence, during the valve displacement its sealing surface is in sliding contact with portions of the nozzle surface and is thereby subjected to a relatively large shear stress. In accordance with the above, and additionally since the valve is actuated by film movement such that the force available for closing the former is limited, it is desirable to minimize frictional forces between the valve and the nozzle while providing a suitable seal for the latter.

Consequently, an important object of this invention is to provide an improved system for applying a processing fluid to a strip of exposed photographic material.

Another primary object of this invention is to provide a film cassette having a fluid applicator system including a relatively inexpensive and extremely effective means for selectively sealing the latter following its operation.

A further object of this invention is to provide a film handling cassette having a fluid applicator system including a slide valve member adapted for cooperation with a nozzle opening for selectively sealing the latter.

SUMMARY OF THE INVENTION

A multipurpose motion picture film handling cassette in accordance with the invention briefly comprises a cassette housing having an applicator system disposed therein which is configured for dispensing processing fluid to the film strip of the film handling cassette at an appropriate time during the operational program. The applicator system includes a nozzle opening which permits flow of the fluid to the film strip and includes a sealing member configured for displacement across the nozzle opening. Carried on the surface of the sealing member is a coating of material which interacts with the processing fluid to conform to the nozzle surface and thereby provide contiguous contact therewith and a peripheral seal around its opening once the sealing member is displaced to its closed position.

In the illustrated embodiment, the sealing member is a slide valve which is displaced across the nozzle in a plane substantially parallel to the plane of engagement with the nozzle opening and between it and a pressure pad, responsive to film movement at the completion of the processing operation. A thin coating located on the nozzle side of the valve is configured to at least become compliant and preferably swell once it contacts the processing fluid, so as to fill any voids between the valve and the nozzle and thereby provide a complete perimetric seal around the nozzle opening. Preferably, a gelatin or polymer coating which expands upon contact with the processing fluid is employed. Advantageously, the coating may also be made to interact with the processing fluid to cement the valve in its closed position.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof will best be understood from the following description of the preferred embodiment when read in connection with the accompanying drawings wherein like numbers have been employed in different figures to denote the same parts and wherein:

FIG. 1 is a diagrammatic plan view of a motion picture film handling cassette embodying the invention;

FIG. 2 is a fragmentary plan view of the film strip employed in the cassette shown in FIG. 1;

FIG. 3 is a plan view of the coating nozzle which forms a part of the cassette shown in FIG. 1;

FIG. 4 is a view in section of the coating nozzle taken along line 4—4 of FIG. 3;

FIG. 5 is a plan view of the sealing member employed in the cassette of FIG. 1;

FIG. 6 is a view in elevation of the sealing member shown in FIG. 3;

FIG. 7 is a view partially in cross section of the applicator system of FIG. 1 showing the sealing member in its closed position; and FIG. 8 is a greatly enlarged fragmentary view of the applicator system as shown in FIG. 7.

DESCRIPTION OF THE PREFERRED EMBODIMENT

The illustrated embodiment of this invention, which may be best understood by first referring to FIG. 1 of the drawing, employs a multipurpose film handling cassette 10 of the type described in the above-mentioned copending patent application which is configured for substantially automatic processing of the film strip responsive to appropriate transport of the latter. In this regard, the cassette of the illustrated embodiment includes an applicator system, later explained in detail, which is operable in accordance with a particular film transport program controlled by a special projector. It should be understood, however, that while the invention disclosed herein is particularly applicable to a cassette of the type described in the copending application it is not restricted to the same and may, of course, be applicable to any multipurpose film cassette.

As shown in FIG. 1, the cassette 10 comprises a generally parallelepiped casing or housing 12 constituted by planar faces or side walls 14 and 16, end walls 17 and 18, and elongated top and bottom edge walls 19 and 20. Carried within the housing 12 is a photographic film strip 22 which is permanently attached at one of its ends, as later explained in regard to FIG. 2, to a rotatable supply spool or reel 24 from which it extends within the casing 12 in a somewhat extended path around suitable rollers generally designated at 27, 28 and 29 to a take-up spool or reel 26 to which the opposite end of the film is attached. In its path within the casing 12, the film 22 extends across a normally inoperative film processing station 30, which is subsequently explained in detail, and across an opening 31 which functions at different times to facilitate both exposure and projection. For facilitating the latter operation, a prism 32 is mounted behind the film strip 22 in an adjoining relation to both the opening 31 and to an illumination aperture (not shown) of the side wall 14.

Before completing the description of the cassette structure itself, it is advantageous to first describe the strip 22 which is utilized therein and is illustrated in FIG. 2 as viewed from the base side, or that is, the outer side of the film as shown in FIG. 1. Preferably, the film strip 22 comprises a base of any suitable transparent material carrying, at least over a photographically useful length 40, an emulsion or photosensitive coating of any conventional variety as, for example, an emulsion capable of being developed by a monobath processing composition to form a positive transparency suitable for projection. A currently preferred embodiment of the invention makes use of a film structure, which, upon the base, comprises a photosensitive layer including both a photosensitive negative emulsion and an image-receiving layer to which a position image may be transferred by diffusion during development without necessitating the subsequent removal of the emulsion containing its developed negative image. This highly desirable feature is made possible by a developed negative image having low covering power. For example, the silver-receptive stratum may be so constructed as to provide an unusually vigorous silver precipitating environment which causes the silver deposited upon it, in comparison with silver developed in the silver halide stratum, to possess very high covering power, i.e., opacity for a given mass of reduced silver. If the silver halide is in such concentration as to give rise only when fully developed to a predetermined low maximum density, and if the silver complex is reduced to silver in a vigorous silver precipitating environment, the resulting negative and positive prints in superposition provide a composite print that presents a good image for projection purposes so long as they are contained on a transparent support. Since the silver halide stratum and the silver-receptive stratum need not be separated, an overall simplification of the silver transfer reversal process is achieved.

A composite film assembly of this type, as well as processing compositions for producing a fully developed black and white image without the necessity of removing the developed negative image after processing is shown in prior U. S. Pat. No. 2,861,885 to Edwin H. Land, which issued on Nov. 25, 1958 for "Photographic Processes And Products." Other composite film assemblies capable of producing developed full color images without the necessity of removing the developed emulsion are shown in prior U. S. Pats. of Edwin H. Land, Nos. 2,726,154, issued Dec. 6, 1955 for "Photographic Product," and 2,944,894, issued July 12, 1960 for "Photographic Process Utilizing Screen Members."

As shown in FIG. 2, the strip 22 includes a leader 38 terminating at an end formed with an aperture 39 which serves to connect that end of the film to the take-up spool 26. Behind the leader 38 is the strip 40 of photographically useful film upon which projectable images may be formed. Following the photographically useful portion 40 is a trailer region, generally designated at 41, which carries at its end, an aperture 42 by means of which that end of the film is configured for connection to the supply spool 24. Carried along one edge of the film strip 22 are a plurality of sprocket holes 43 which are configured for cooperation with a drive pawl (not shown) in either a camera or projector for incremental advancement of the film. Adjacent the trailing end 41, the series of sprocket holes 43 are interrupted by a first elongated sprocket hole 44 which may, for example, span two of the sprocket holes 43. Further, along the film in the direction of the supply reel end, the series of sprocket holes 43 is again interrupted by a second elongated hole 45, longer than the sprocket hole 44, and for example, spanning three of the sprocket holes 43.

As described in the aforementioned copending patent application, the first elongated sprocket hole 44 terminates the advance of the film in the camera (not shown) and thereby establishes an exposure end point, whereas the second sprocket hole 45 determines a film take-up or projection end point in the projector apparatus (not shown). These different termination points are employed since it is preferred to advance the film beyond the exposure end point before applying processing composition to the exposed film, and for that purpose, a double film drive pawl (not shown) such that the film may be carried beyond the first elongated hole 44 until the second elongated hole 45 is encountered. This further advancement of the film in the projector unit is accomplished in order to bring a detent engaging element or projecting bump 47 into cooperative engagement with a pressure pad element of the processing station 30 as will be subsequently described. Additionally, the leader end 38 of the film strip 22 carries another detent engaging means, here shown as an aperture 49, which serves to actuate a valve member also forming a part of the processing station 30 to be subsequently described.

Referred again to FIG. 1, the film processing station 30 generally comprises a housing 50 having a first compartment or receptacle 58 retaining a source of processing fluid or composition 52 mounted over a second internal chamber 54 which communicates with a coating nozzle generally designated at 56. The fluid 52 which may, for example, be an aqueous alkaline solution such as is described in the aforementioned U. S. Pat. No. 2,861,885, is initially retained with the tublike receptacle 58 by means of a tear-tab 60. The tear tab 60 extends from the housing 50 to an actuating assembly generally designated at 62. The latter, as described in the aforementioned copending patent application Ser. No. 227,092 extends beneath the supply spool 24 to a hook-like end member 61 which is releasably latched to an upright post 63 and in engagement with a cam member 64. As later explained, upon insertion of the cassette 10 into the projector (not shown) the cam 64 is appropriately displaced by a cassette-latching shaft (not shown) of the projector to drive the hook 61 from the post 63 and into engagement with the teeth 25 of the supply spool 24 under the urging of a spring 65. Then upon subsequent rotation of the spool in the rewind direction shown by the arrow in FIG. 1, the actuating assembly 62 is similarly rotated to tear the tab 60 from the receptacle 58 and thereby releases its fluid 52 to the nozzle 56.

Mounted beneath the exterior surface 68 of the nozzle 56 is a pressure pad assembly 70, which is shown in FIG. 1 in the initial position assumed upon assembly of the cassette and prior to processing. As shown, the film strip 22 normally passes between the nozzle surface 68 and the pad 70. The latter is mounted on and biased towards the nozzle surface 68 by a leaf spring 72, and one end 73 of the pad 70 is configured to engage the base of the film 22 so as to cooperate with a protuberance 46 of the trailing end thereof as will be subsequently explained.

As is shown more clearly in FIGS. 3 and 4, the nozzle 56 includes an orifice or nozzle opening 65 enclosed by a U-shaped film engaging land or surface portion 67 and a doctor blade surface 66. The latter surface 66 is depressed slightly, for example, up to 0.001 of an inch, below the substantially planar surface portion 67 and controls the thickness of the processing fluid applied during the processing operation. The blade surface 66 in conjunction with portions of the U-shaped surface 67 form the perimeter of the orifice 65, which as later explained in regard to FIG. 7, are appropriately sealed following treatment of substantially the complete length of the film strip 22. The nozzle 56 is provided at its sides with depending posts 69 and 71 which provide guidance for the film strip 22 in its path past the orifice 65 and also serve as stops for the sealing member which is described below.

Displaceably mounted in adjoining relation to the other end 74 of the pressure pad 70 is a sealing member or wedge-like slide-valve 78 which is shown in greater detail in FIGS. 5 and 6. As shown therein, the valve 78 includes a substantially planar valve plate 80 formed at one end 81 with tapering sides which serve to guide the plate into a juxtaposed relation beneath the nozzle opening 65. In that position, a pair of shoulders 83 and 85 cooperate with the stops 69 and 71 to stop the valve in its closed position.

Carried on either side of the valve plate 80 are depending orthogonal extensions forming a pair of depending cams 82 and 84, respectively, which serve to depress the pressure pad assembly 70 away from film engagement as will be subsequently explained in regards to operation of the cassette. As shown, the cam 82 is shorter than the cam 84 so as to facilitate threading of the film strip 22 during assembly of the cassette 10. Toward the left end of the plate 80, the cam 84 forms an arm portion 86 extended parallel to the plate. Integrally formed with the arm 86 is a spring arm extension 88 which engages the film 22 and is adapted to cooperate with the film aperture 49 of its trailing end so as to thereby displace the slide valve 78 into its closed position at the completion of the initial rewind as later explained with regards to the operation of the cassette.

Carried on the valve plate 80 in proper position for cooperation with the nozzle surfaces bounding the opening 65, is a sealing coating 90 configured for providing a contiguous, perimetric contact around the opening following displacement of the valve 78 to its closed position shown in FIGS. 7 and 8. Preferably, the coating 90 is a thin coating of suitable material which in its deposited state is capable of withstanding the shearing forces resulting from displacement of the valve across the nozzle surface and which is configured to interact with the processing fluid so as to at least soften, and preferably to swell into conformance with the surfaces forming the perimeter of the nozzle opening 65 so as to thereby fill any voids in the seal area.

Advantageously, any conventional sponge-like material which is capable of absorbing or otherwise interacting with the processing fluid so as to swell into pressure contact with the nozzle would be useful. A gelatin coating as, for example, a coating of bone gelatin will be suitable inasmuch as such material swells when placed in contact with alkaline solutions. Advantageously, bone gelatin is also an excellent adhesive so that upon normal drying of the alkaline processing fluid, the wedge-valve is cemented in its final location. Further, a synthetic polymer such as, for example, an acrylic latex is preferred since it not only may be deposited in a sufficiently thin layer so as to not only minimize interference with displacement of the valve and to also provide relatively high adhesion to the plate so as to resist stripping during this displacement, but additionally softens in contact with the alkaline processing solution and can easily provide up to a 10:1 increase in size over its original condition when contacted by the processing fluid. Advantageously, the latex polymer may also be easily deposited upon the plate by any conventional means such as spraying, or dipping, etc.

As indicated previously in this embodiment, the displacement of the slide valve to its closed position is responsive to the force of the film movement. Hence, the displacement force is of limited magnitude and it is important that the coating provide minimum interference with the movement of the valve across the nozzle surface 68. This is particularly important in the illustrated embodiment, where the slide valve 78 additionally functions to cam away the pressure pad 70, and hence, the coating 90 is continuously forced against the nozzle surface 67 during the valve displacement. To facilitate these requirements, the sealing coating of the illustrated embodiment is deposited to a thickness of approximately 0.001".

To enable a more complete understanding of the novel unit, the overall operation of the system will now be explained. As previously indicated, upon insertion of the cassette 10 into a projector (not shown) following exposure of its film, a latching-shaft (not shown) enters the cassette and depresses the cam 64 thereby releasing the pod actuating assembly 62 into spool engagement. Then, the film 22 is driven slightly further forward by the double claw (not shown) so as to bring the film protuberance 47 into contact with the end 73 of the pad 70 and thereby displace the latter to the left from its initial position shown in FIG. 1. This permits the pad 70 to spring upwardly to its operative position (not shown) under the urging of the spring 72 and thereby carry the emulsion side of the film strip 22 into coating engagement with the nozzle surface 67. Thereafter, upon initiation of film rewind, and hence, clockwise rotation of the film spool 24, the tab 60 is torn from the fluid receptacle 54 so as to release the fluid 52. The latter flows to the nozzle opening 65 and through it to the film strip 22 such that a thin layer of processing fluid is deposited on the film during the rewind operation. Then at the end of the rewind, as the film strip 22 is substantially completely rewound onto the supply reel 24, engagement of the aperture 49 with the arm 86 of the valve 78 displaces the latter to the right as shown in FIG. 1 and across the nozzle opening 65 to its closed position as shown in FIG. 7.

Upon reaching its sealing location wherein its shoulders 83 and 85 are positioned against the stops 69 and 71 of the nozzle 56, the valve coating 90 is brought into contact with remaining portions of the fluid 52 in the area of the orifice 65 and appropriately interact with the latter to soften and preferably significantly expand so as to fill any voids existing between the valve plate 80 and the nozzle surfaces 66 and 67. As shown more clearly in FIG. 8, the coating 90 specifically fills the depression provided by the doctor blade surface 66 and prevents any further escape of fluid at this point.

It will be seen that by this invention there is provided an improved photographic cassette and fluid applicator which efficiently treats photographic film following its exposure; and includes means for effectively sealing the applicator nozzle upon completion of its operation. An efficient sealing member which includes material configured for interacting with the processing fluid to form a permanent seal of the applicator nozzle is disclosed. Further, the seal material is also adapted to cement the sealing member in its final position.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A film handling cassette comprising:
    a housing configured for retaining a photographic film strip;
    means within said housing for facilitating the application of a processing fluid to such film strip including a dispensing container configured for receiving such processing fluid, said container including a nozzle having an opening through which such processing fluid may be expressed to such film strip; and
    means within said housing for selectively sealing said orifice following treatment of such film strip with such fluid, said sealing means including a member configured for displacement thereof into juxtaposed relation with such nozzle opening, and said member including a coating of material configured for interacting with such processing fluid so as to provide a substantially contiguous seal around the perimeter of said opening.

2. The cassette of claim 1 wherein said coating is soluble in such processing fluid and softens in contact therewith so as to mold itself into conformance with said perimeter of said nozzle following such displacement.

3. The cassette of claim 1 wherein said coating is of material configured for expanding upon contact with such processing fluid so as to expand into conformance with said nozzle perimeter and increase the seal pressure between the latter and said valve member following such displacement.

4. The cassette of claim 1 wherein said coating is a gelatin coating.

5. The cassette of claim 1 wherein said coating is a polymer coating.

6. The cassette of claim 5 wherein said coating is an acrylic latex.

7. The cassette of claim 1 wherein said coating is a gelatin.

8. The cassette of claim 1 wherein said housing includes a film engaging land partially encompassing said opening and a doctor blade member spaced from said land and providing a controlled opening between said nozzle and said film strip for depositing a layer of predetermined thickness thereon, and said coating is of material configured for interacting with such fluid so as to swell into contact with said land and said doctor blade to provide said contiguous seal.

9. The cassette of claim 1 wherein said sealing member is configured for displacement slideably across said nozzle opening in a plane parallel to and substantially abutting the plane of said nozzle, and said coating is a very thin coating configured to provide minimum resistance to said displacement.

10. An applicator system useful in applying a coating of processing fluid to a strip of exposed photographic material comprising:
    a housing having nozzle means defining an opening through which such processing fluid may be expressed and means for conducting such processing fluid to said opening; and
    sealing means displaceably mounted in adjoining relation to said opening and configured for displacement between a first position where it is spaced from said opening and a second position wherein it is in juxtaposed relation thereto, and said sealing means including a coating of material configured for interacting with such processing fluid so as to conform to the perimeter of said opening and thereby provide substantially contiguous contact between said sealing coating and said perimeter of said opening.

11. The applicator of claim 10 wherein said coating is capable of interacting with said fluid so as to expand into sealing contact with said perimeter of said opening following such displacement.

12. The applicator of claim 10 wherein said coating is a gelatin.

13. The applicator of claim 10 wherein said coating is a polymer coating.

14. The applicator of claim 13 wherein said coating is an acrylic latex.

15. The applicator of claim 1 wherein said housing includes a non-planar surface area surrounding said opening, and said sealing means comprises a member having a planar surface portion configured for juxtaposed relation to said opening, said coating of material being located on said planar surface portion of said member and configured for interacting with such fluid so as to conform to said non-planar surface area of said housing.

* * * * *